S. SULENSKI.
MOUSE TRAP.
APPLICATION FILED MAY 24, 1918.

1,292,916.

Patented Jan. 28, 1919.

Inventor
S. Sulenski
By A. M. Wilson
Attorney

UNITED STATES PATENT OFFICE.

STANISLAW SULENSKI, OF HOLYOKE, MASSACHUSETTS.

MOUSE-TRAP.

1,292,916. Specification of Letters Patent. Patented Jan. 28, 1919.

Application filed May 24, 1918. Serial No. 236,328.

*To all whom it may concern:*

Be it known that I, STANISLAW SULENSKI, a citizen of Russia, residing at Holyoke, in the county of Hampden and State of Massachusetts, have invented certain new and useful Improvements in Mouse-Traps, of which the following is a specification.

The primary object of the invention is the provision of a trap adapted for catching small animals such as rats and mice the device being adapted for anchoring at any convenient point and being easy and inexpensive to manufacture.

A further object of the invention is the provision of an animal trap readily anchored to the earth and set for easy trapping by the weight of an animal while the animal when caught will be killed or held in position by means of any suitable weight which has been placed upon the device prior to the tripping of the trap mechanism.

Figure 1:
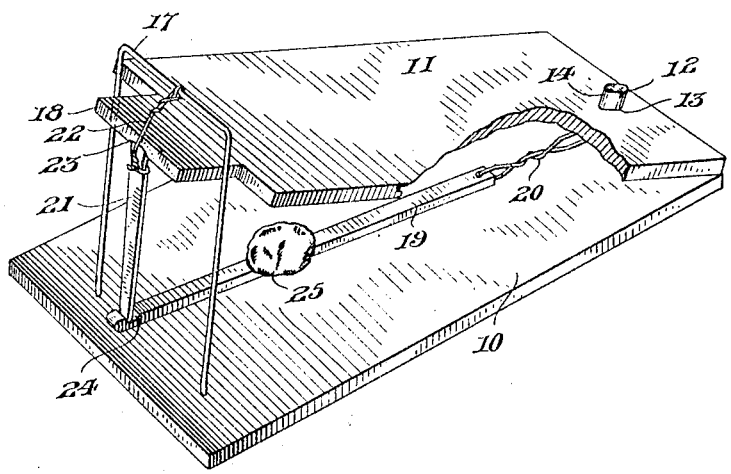
Figure 2:
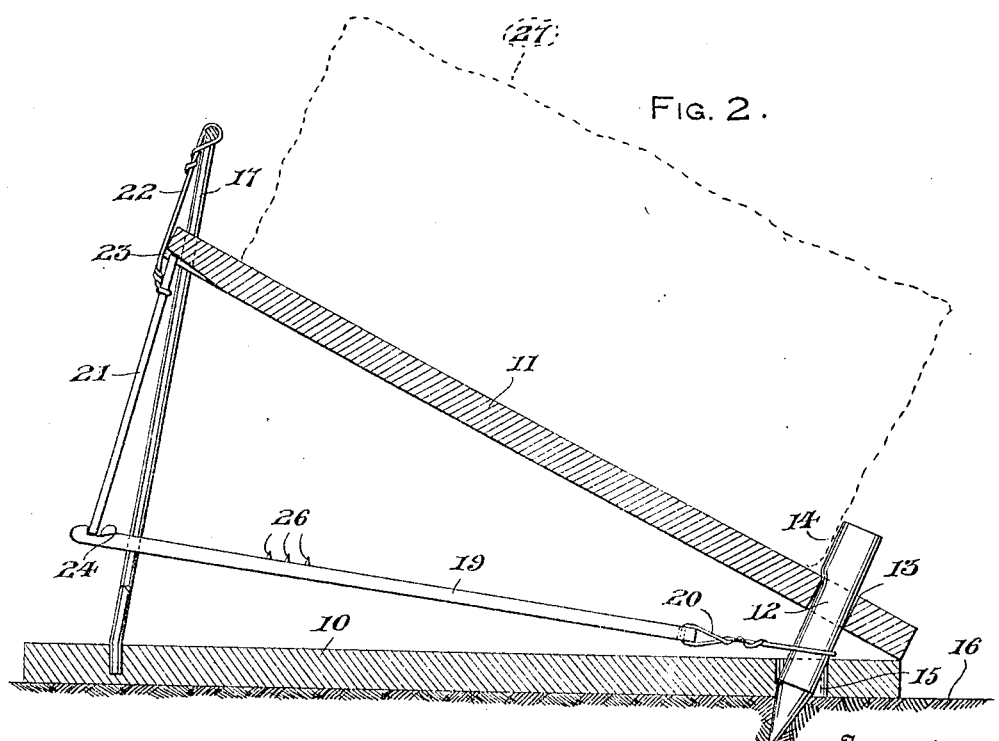

In the drawings forming a part of this application and in which like reference characters refer to corresponding parts throughout the several views, Figure 1 is a perspective view of the device with a portion thereof broken away and Fig. 2 is a vertical longitudinal sectional view of the same with the operating weight indicated by dotted lines:

My trap broadly consists of a base 10 having a plate 11, of substantially the same dimensions as the base pivoted to the latter at the rear end of the device by means of a post 12, the arrangement being such as to position the plate and base separated from each other when the trap is set so as to approach each other for catching the animal therebetween when tripped or sprung.

The post 12 extends through a perforation 13 in the plate 11, being prevented from passing therethrough by means of the enlarged head 14 of the post 12. The said post freely extends through a perforation 15 in the base 10 and may be projected into the ground such as 16 upon which the base is positioned for suitably anchoring the trap.

An anchor staple 17 is mounted upon the base 10 with the reduced forward end 18 of the plate 11 swingingly positioned therethrough whereby the upward swinging movement of the plate 11 is limited. A tripping tongue 19 is positioned between the base 10 and plate 11 with its rear end secured to the post 12 by means of a flexible connection such as wire 20.

A detent 21 is suspended from the arch 17 by means of a wire or cord 22 and is adapted for fitting with its opposite ends in a forwardly positioned groove 23 in the plate 11 and a notch 24 adjacent the free forward end of the tongue 19. Any suitable bait such as a piece of cheese 25 may be mounted upon prongs 26 carried by the tongue 19.

The operation of the device will be apparent from this detailed description thereof, the plate 11 being held inclined by the detent 21 positioned within the groove 23 while the tongue 19 prevents the forward swinging movement of the detent as illustrated in both views of the drawing. A suitable weight such as a stone 27 is mounted upon the plate 11 and when an animal seeking the bait 25 depresses the tongue 19, the latter is detached from the detent 21 which flies forwardly and releases the plate 11. The weight of this plate and the stone 27 forcibly depresses the plate 11 upon the animal thereby catching and holding the animal between the plate 11 and base 10. Sufficient play is allowed for the post 12 to permit free pivotal movement of the plate 11 and as the base 10 and plate 11 may be both formed of wood as well as the tongue 19 and detent 21 and post 12, it will be seen that the device may be easily and cheaply made.

What I claim as new is:—

A trap comprising a base, a plate above the base, the rear ends of the base and plate being apertured and in normal contact with each other, a pointed anchoring post extending through the apertures of the base and the plate to pivotally connect the same, said post having a head to prevent separation of the plate from the base, an arch carried by the forward end of the base and having the forward end of the plate vertically shiftably positioned therein, a bait supporting tongue positioned between said base and plate, a flexible connector attached at one end to said tongue and having the post extended through the other end thereof, a detent adapted to be positioned between the tongue and plate when the device is set, and a flexible connection between the detent and the top of said arch.

In testimony whereof I affix my signature.

STANISLAW SULENSKI.

In the presence of—

R. L. DAVENPORT.

Copies of this patent may be obtained for five cents each, by addressing the "Commissioner of Patents, Washington, D. C."